Dec. 13, 1932.                P. ALTUNA                1,890,442
SHOCK ABSORBING APPARATUS FOR MASSIVE WHEELS
Filed Feb. 17, 1932        2 Sheets-Sheet 1

Inventor:
Pedro Altuna

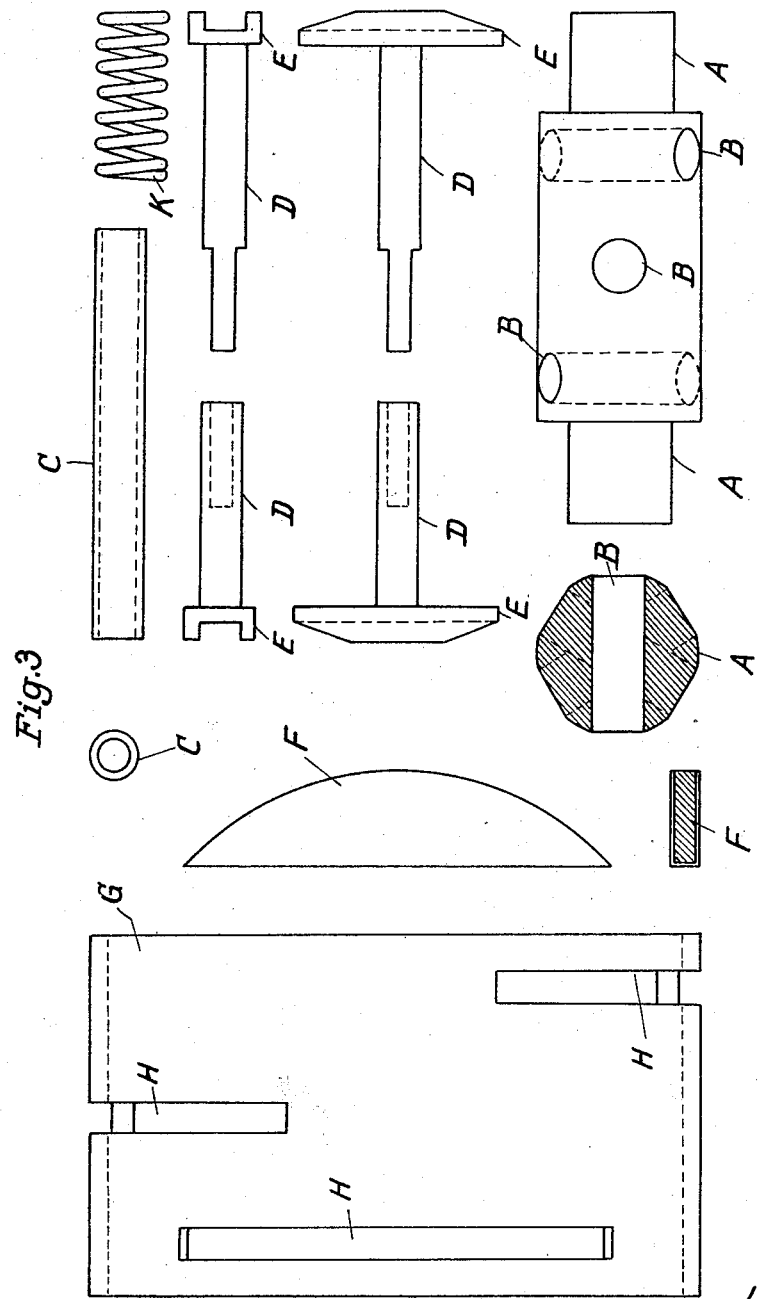

Patented Dec. 13, 1932

1,890,442

UNITED STATES PATENT OFFICE

PEDRO ALTUNA, OF SAN SEBASTIAN, SPAIN

SHOCK-ABSORBING APPARATUS FOR MASSIVE WHEELS

Application filed February 17, 1932, Serial No. 593,617, and in Spain January 22, 1932.

My invention relates to improvements in shock-absorbing apparatus for massive wheels. The same is adaptable to carriages in general, to which it gives such elasticity, that it renders air-chambers quite unnecessary, since, besides giving smoother running, it avoids the danger of burstings and punctures, which are the cause of so many accidents.

This apparatus is composed of a special axle, with perforations suitably distributed, and whose number is not limited, through which perforations pass a similar number of free spokes, whose forked-head extremities rest on straight sliding pieces which are parallel to one another.

As the spokes are not fixed in any way, they slide not only through the perforations, but also on the above-mentioned guides, carrying, placed between the axle and the guides, spiral springs which receive the shock produced by contact of the wheel with obstacles on the road, so that the repercussion of these shocks on the axle is avoided, as they are completely deadened.

Figure 1:
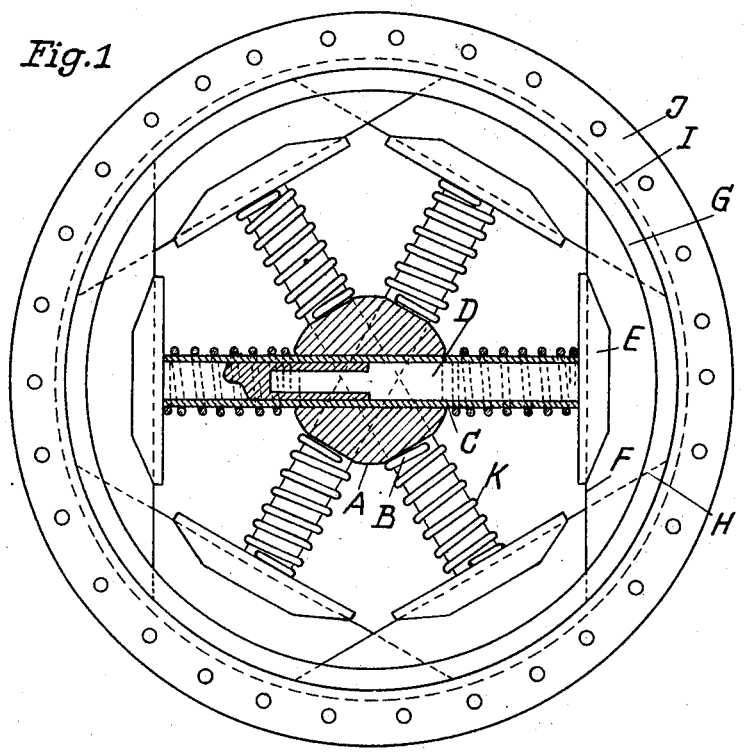
Figure 2:
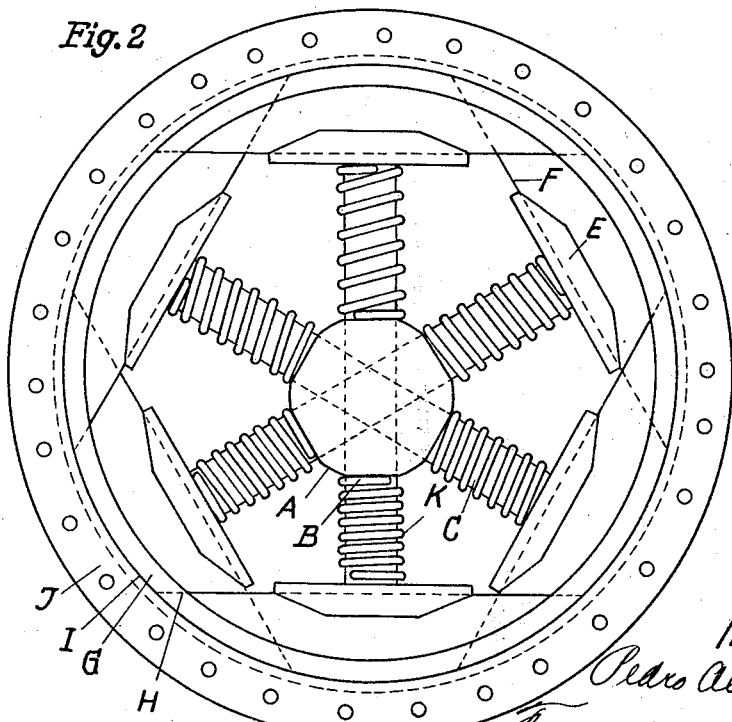

In order that this invention may be better understood, drawings are accompanied, in which Fig. 1 shows the complete apparatus, Fig. 2 gives another view, showing how the effect of a sudden shock is mitigated, before it reaches the massive wheel, Fig. 3 shows the apparatus divided in separate parts.

A is the special axle, B shows the perforations in it, C is a hollow tube, forming part of the spoke, D are rods with forked-head extremities which, with the tube C, complete the spoke. E shows the forked-head part united to the rods D. F is the guide on which runs the part E. G is a cylindrical hub with grooves, into which enter the guiding parts F. H shows the grooves of the hub G. I is another cylindrical hub, which covers the apparatus. J shows the connecting part of the spokes of the hub I, and K indicates the spiral springs of the apparatus.

The mounting and working of the apparatus is effected as follows: The tubes C are first passed through the perforations B of the axle A, and, after the springs K have been added, the rods D are introduced into each end of the tube C, the axle being placed with the said pieces within the hub G in such a way, that the grooves H of this hub may coincide with the centre of the forked heads E attached to the rods D. The guiding parts F are then placed in the grooves H of the hub G, so as to fit within the forked-head pieces E, and when all this is covered by means of pressure or screwed to the other hub I, they are united in a single body, with no other fixing than what has already been mentioned.

Then, when this hub I has been united to the corresponding wheel, the axle A is coupled to the carriage for which it is intended, and when its revolving movement commences, the shock-absorbing apparatus revolves together with the wheel.

Now, as those spokes are not fixed either to the axle A or to the runners F and can therefore slide freely and independently of one another, both through the perforations B of the axle A and over the guides or runners F, the result is that when the tension of the springs K is normal, the axle A remains in its central position (see Fig. 1) but it moves from this central position in any direction when the springs K are compressed or stretched on receiving the effect of the contact of the wheel with any obstacle (see Fig. 2), so that this effect is mitigated before it reaches the axle A, this being the object of the present invention.

Having now described my invention, what I claim is:

1. In a wheel center, an inner hub having a series of diametrically disposed openings therein, spokes slidable through said openings independently of each other and projecting at both ends from the hub, an outer annular hub normally concentric to the inner hub, sliding connections between the extremities of each stroke and the outer hub, and compression springs surrounding the projecting ends of the spokes and normally holding the hub centrally on the spokes.

2. In a wheel center, an inner hub having a series of diametrically disposed openings therein, spokes slidable through said openings independently of each other and projecting at both ends from the hub, an outer annular hub normally concentric to the inner hub, guides forming chords across the inner periphery of the outer spokes, forked heads carried by the ends of the spokes and slidable on said guides, and compression springs between said forked heads and the inner hub.

3. In a wheel center, an inner hub having a series of diametrically disposed openings therein, spokes slidable through said openings independently of each other and projecting at both ends from the hub, an outer annular hub normally concentric to the inner hub, guides forming chords across the inner periphery of the outer spokes, forked heads carried by the ends of the spokes and slidable on said guides, and compression springs between said forked heads and the inner hub, said spokes having tubular bodies and the forked heads having stems entering the ends of the tubular bodies.

4. In a wheel center, an inner hub having a series of diametrically disposed openings therein, spokes slidable through said openings independently of each other and projecting at both ends from the hub, an outer annular hub normally concentric to the inner hub, guides forming chords across the inner periphery of the outer spokes, forked heads carried by the ends of the spokes and slidable on said guides, and compression springs between said forked heads and the inner hub, said guides having arcuate faces engaging said outer hub and the outer hub being slotted to receive said arcuate faces.

5. In a wheel center, an inner hub having a series of diametrically disposed openings therein, spokes slidable through said openings independently of each other and projecting at both ends from the hub, an outer annular hub normally concentric to the inner hub, guides forming chords across the inner periphery of the outer spokes, forked heads carried by the ends of the spokes and slidable on said guides, and compression springs between said forked heads and the inner hub, said guides having arcuate faces engaging said outer hub and the outer hub being slotted to receive said arcuated faces, said spokes having tubular bodies and the forked heads having stems entering the ends of the tubular bodies.

Signed at Madrid, Spain this 29th day of January A. D. 1932.

PEDRO ALTUNA.